United States Patent
Kimura et al.

(10) Patent No.: US 9,518,211 B2
(45) Date of Patent: Dec. 13, 2016

(54) METHOD FOR RECOVERING OIL

(71) Applicants: Wintershall Holding GmbH, Kassel (DE); BASF SE, Ludwigshafen (DE)

(72) Inventors: Riichiro Kimura, Ludwigshafen (DE); Stefan Maurer, Ludwigshafen (DE); Andrei-Nicolae Parvulescu, Heidelberg (DE); Lorenz Siggel, Heidelberg (DE); Ulrich Müller, Neustadt (DE); Thomas Frechen, Heidelberg (DE); Bernd Hinrichsen, Stuttgart (DE)

(73) Assignees: BASF SE, Ludwigshafen (DE); Wintershall Holding GmbH, Kassel (DE)

( * ) Notice: Subject to any disclaimer, the term of this patent is extended or adjusted under 35 U.S.C. 154(b) by 0 days.

(21) Appl. No.: 14/760,623

(22) PCT Filed: Jan. 15, 2014

(86) PCT No.: PCT/EP2014/050709
§ 371 (c)(1),
(2) Date: Jul. 13, 2015

(87) PCT Pub. No.: WO2014/114538
PCT Pub. Date: Jul. 31, 2014

(65) Prior Publication Data
US 2015/0361325 A1 Dec. 17, 2015

(30) Foreign Application Priority Data

Jan. 25, 2013 (EP) ..................... 13152792
Apr. 18, 2013 (EP) ..................... 13164298
Jun. 26, 2013 (EP) ..................... 13173834

(51) Int. Cl.
C09K 8/58 (2006.01)
E21B 43/16 (2006.01)
C09K 8/26 (2006.01)

(52) U.S. Cl.
CPC .............. *C09K 8/58* (2013.01); *C09K 8/265* (2013.01); *E21B 43/16* (2013.01)

(58) Field of Classification Search
CPC ................................. E21B 43/16; C09K 8/58
See application file for complete search history.

(56) References Cited

U.S. PATENT DOCUMENTS 4,160,742 A 7/1979 Raman
4,686,066 A 8/1987 Hofinger et al.
(Continued)

FOREIGN PATENT DOCUMENTS

CN 101845297 9/2010
WO WO-98/53181 11/1998
WO WO-2011/162944 12/2011

OTHER PUBLICATIONS

PCT International Search Report in PCT/EP2014/050709, dated Feb. 17, 2014, 4 pages.
(Continued)

*Primary Examiner* — Zakiya W Bates
*Assistant Examiner* — Crystal J Miller
(74) *Attorney, Agent, or Firm* — Servilla Whitney LLC

(57) ABSTRACT

The present invention relates to a process for recovering oil from a subterranean formation by injecting both solid particles and water into the formation. An oil-in-water emulsion that is stabilized by solid particles is formed in the pores of the formation. This emulsion is recovered from the subterranean formation.

13 Claims, 4 Drawing Sheets

(56) References Cited

U.S. PATENT DOCUMENTS

| | | | |
|---|---|---|---|
| 4,938,876 A | 7/1990 | Ohsol | |
| 5,045,212 A | 9/1991 | Augustin et al. | |
| 5,855,243 A * | 1/1999 | Bragg | C09K 8/26 166/275 |
| 5,910,467 A * | 6/1999 | Bragg | C09K 8/26 507/102 |
| 5,927,404 A * | 7/1999 | Bragg | C09K 8/26 166/275 |
| 6,068,054 A * | 5/2000 | Bragg | C09K 8/26 166/270 |
| 6,077,400 A | 6/2000 | Kartchner | |
| 6,086,830 A | 7/2000 | Kartchner | |
| 6,734,144 B2 * | 5/2004 | Varadaraj | C09K 8/36 166/305.1 |
| 6,988,550 B2 * | 1/2006 | Bragg | C09K 8/265 166/275 |
| 7,186,673 B2 * | 3/2007 | Varadaraj | C09K 8/36 166/305.1 |
| 7,338,924 B2 * | 3/2008 | Varadaraj | C09K 8/58 166/270 |
| 7,652,073 B2 * | 1/2010 | Varadaraj | C09K 8/58 516/22 |
| 7,652,074 B2 * | 1/2010 | Varadaraj | C09K 8/58 507/202 |
| 8,044,014 B2 * | 10/2011 | Gerusz | B28B 7/384 510/240 |
| 8,408,299 B2 * | 4/2013 | Kaminsky | C09K 8/58 166/266 |
| 2001/0049902 A1 * | 12/2001 | Varadaraj | C09K 8/36 44/301 |
| 2003/0220204 A1 * | 11/2003 | Baran, Jr. | B82Y 30/00 507/200 |
| 2004/0014821 A1 * | 1/2004 | Varadaraj | C09K 8/58 516/53 |
| 2004/0122111 A1 * | 6/2004 | Varadaraj | C09K 8/36 516/21 |
| 2008/0103077 A1 * | 5/2008 | Varadaraj | C09K 8/58 508/577 |
| 2010/0175896 A1 * | 7/2010 | Owen | C10G 1/065 166/401 |
| 2010/0243248 A1 * | 9/2010 | Golomb | C09K 8/58 166/270 |
| 2010/0272765 A1 * | 10/2010 | Ho O | A01N 25/04 424/401 |
| 2010/0326662 A1 * | 12/2010 | Kaminsky | C09K 8/58 166/305.1 |
| 2013/0203601 A1 * | 8/2013 | Fowler | A01N 25/04 504/234 |
| 2013/0327523 A1 * | 12/2013 | Santa | C09K 8/58 166/268 |
| 2013/0327524 A1 * | 12/2013 | Sangermano | C09K 8/50 166/270 |
| 2014/0034297 A1 * | 2/2014 | Mahaffey | C09K 8/58 166/246 |
| 2014/0083704 A1 * | 3/2014 | Sangermano | C09K 8/50 166/305.1 |
| 2014/0110305 A1 * | 4/2014 | Barnes | C09K 8/584 208/14 |
| 2015/0175876 A1 * | 6/2015 | Resasco | E21B 43/166 166/270.1 |

OTHER PUBLICATIONS

PCT International Written Opinion in PCT/EP2014/050709, dated Feb. 17, 2014, 4 pages.
PCT International Preliminary Report on Patentability in PCT/EP2014/050709, dated Jul. 28, 2015, 5 pages.

* cited by examiner

METHOD FOR RECOVERING OIL

CROSS-REFERENCE TO RELATED APPLICATIONS

This application is the National Stage entry of PCT/EP2014/050709, filed on Jan. 15, 2014, which claims priority to European Application Numbers 13152792.1, filed on Jan. 25, 2013, and 13164298.5 filed on Apr. 18, 2013, and 13173834.6 filed Jun. 26, 2013 which are incorporated herein by reference in their entireties.

TECHNICAL FIELD

The present invention relates to a process for recovering oil from a subterranean formation by injecting both solid particles and water into the formation. An oil-in-water emulsion that is stabilized by solid particles is formed in the pores of the formation. This emulsion is recovered from the subterranean formation.

BACKGROUND

In natural mineral oil deposits, mineral oil is present in the cavities of porous reservoir rocks which are closed off from the earth's surface by impermeable covering layers. The cavities may be very fine cavities, capillaries, pores or the like. Fine pore necks can have, for example, a diameter of only about 1 μm. In addition to mineral oil, including natural gas fractions, the deposits comprise water having a higher or lower salt content.

In mineral oil production, a distinction is made between primary, secondary and tertiary production.

In primary production, after sinking of the well into the deposit, the mineral oil flows by itself through the well to the surface owing to the autogenous pressure of the deposit. However, in general only from about 5 to 10% of the amount of mineral oil present in the deposit, depending on the type of deposit, can be extracted by means of primary production, after which the autogenous pressure is no longer sufficient for extraction.

Secondary production is therefore used after the primary production. In secondary production, further wells are drilled into the mineral oil-carrying formation, in addition to the wells which serve for production of the mineral oil, the so-called production wells. Water and/or steam is forced into the deposit through these so-called injection wells in order to maintain or to increase again the pressure. By forcing in the water, the mineral oil is forced slowly through the cavities in the formation, starting from the injection well, in the direction of the production well. However, this functions only as long as the cavities are completely filled with oil and the water pushes the more viscous oil in front of it. As soon as the low-viscosity water penetrates through cavities, it flows from this time on along the path of least resistance, i.e. through the resulting channel between the injection wells and the production wells, and no longer pushes the oil in front of it. As a rule, only from about 30 to 35% of the amount of mineral oil present in the deposit can be extracted by means of primary and secondary production.

It is known that the mineral oil yield can be further increased by tertiary oil production measures. Tertiary mineral oil production includes processes in which suitable chemicals are used as assistants for oil production. These include the so-called "polymer flooding". In polymer flooding, an aqueous solution of a polymer having a thickening effect is forced instead of water through injection wells into the mineral oil deposit. By forcing in the polymer solution, the mineral oil is forced through said cavities in the formation, starting from the injection well, in the direction of the production well, and the mineral oil is finally extracted via the production well. Owing to the high viscosity of the polymer solution, which is adapted to the viscosity of the mineral oil, the polymer solution can no longer, or at least not so easily, break through cavities as is the case with pure water.

As an alternative approach, water-in-oil macroemulsions have been proposed as a method for producing highly viscous drive fluids that can maintain effective mobility control while displacing moderately viscous oils. For example, the use of water-in-oil and oil-in-water macroemulsions have been evaluated as drive fluids to improve oil recovery of viscous oils. Such emulsions have been created by addition of sodium hydroxide to acidic crude oils. In particular, U.S. Pat. No. 5,927,404 and U.S. Pat. No. 6,068,054 describe oil-in-water and water-in-oil emulsions that are stabilized by solid particles. These emulsions can be used to displace oil in subterranean formations.

U.S. Pat. No. 6,988,550 discloses a method to prepare an oil-in-water emulsion in a subterranean formation in the presence of hydrophilic particles such as bentonite clay and kaolinite clay both of which comprise negatively charged layers and cations in the interlayer spaces.

However, a more economic approach is to form an oil-in-water emulsion containing solid particles in situ in the subterranean oil-containing formation, recover the oil-in-water emulsion and separate off the different components so that the solid particles can be reused.

SUMMARY

Thus, an object of the presently claimed invention is to provide a process for recovering oil from a subterranean oil-containing formation that is highly economic and easy to carry out.

The object was met by providing a process for recovering oil from a subterranean oil-containing formation comprising at least the steps of:

a) introducing solid particles and water into the subterranean oil-containing formation to obtain a solid particles-stabilized emulsion containing droplets, whereby water is the continuous phase and oil is the dispersed phase, and b) recovering said solid particles-stabilized emulsion from the subterranean oil-containing formation, whereby the solid particles comprise at least one layered double hydroxide of general formula (I)

$$[M^{II}_{(1-x)}M^{III}_{x}(OH)_2]^{x+}[A^{n-}]_{x/n}\cdot yH_2O \qquad (I),$$

wherein
$M^{II}$ denotes a divalent metal ion or 2Li,
$M^{III}$ denotes a trivalent metal ion,
$A^{n-}$ denotes an n-valent anion,
n is 1 or 2,
x is the mole fraction having a value ranging from 0.1 to 0.5 and
y is a value ranging from 0 to 5.0.

DETAILED DESCRIPTION

Figure 1:
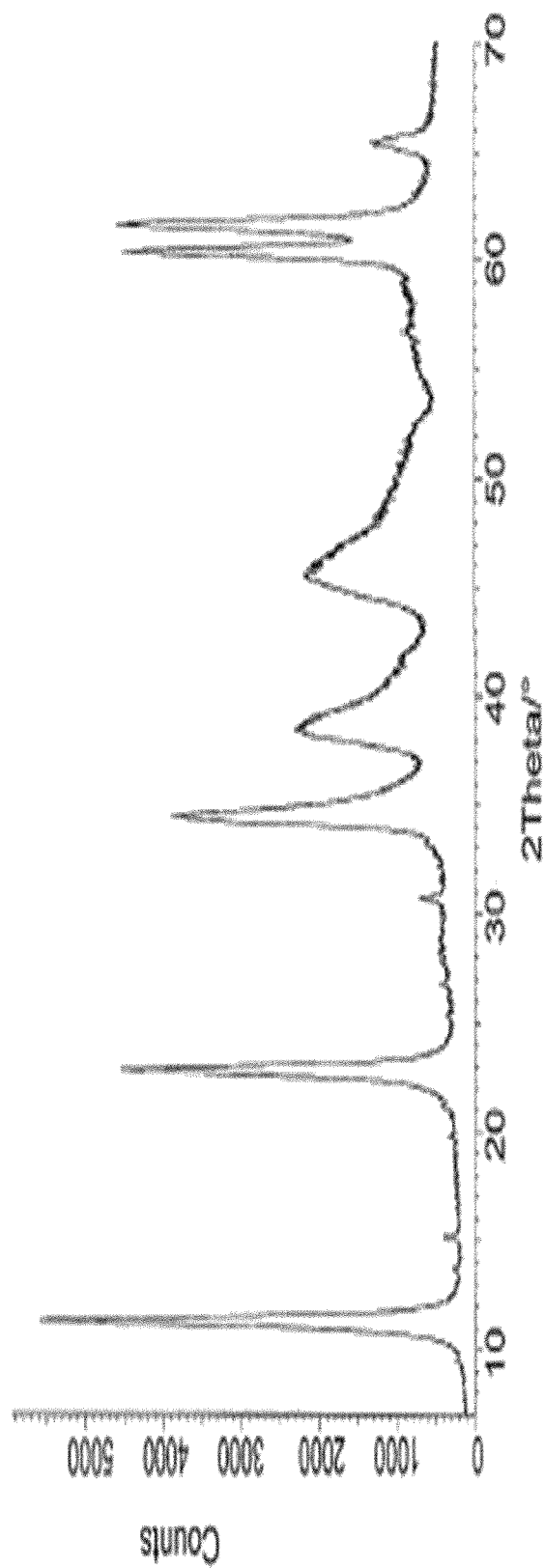
FIG. 1 is an XRD of the final product of Example 1.

The term "stability" or "stabilized" refers to the period up to incipient separation, and in which the emulsion does not visually show segregation, such as the formation of a visible bottom layer of water and/or a visible top layer of oil.

For evaluating the stability, as used in this invention, a test method is to be used wherein a sample of 100 g of emulsion is stored in a test tube with an inner diameter of 2.5 cm and sufficient length. The tube is stored at a selected temperature and monitored over time for separation to occur, i.e. for formation of a top or bottom layer. The stability is then the time elapsing between filling the test tube and the observation of the separation phenomenon. The temperature is to be chosen such that it is above the melting temperature of the compound in the emulsions with the highest melting temperature, and below the boiling temperature of the lowest boiling compound of the emulsion. Suitably it is chosen between 30° C. and 300° C.

The solid particles can arrange themselves at positions on the oil/water interface in a manner to prevent droplet coalescence, thus forming a stable emulsion. Preferably, the inventive emulsion shows a stability of 1 to 30 days at a temperature in the range of 30 to 200° C., more preferably a stability of 5 to 20 days at a temperature in the range of 30 to 200° C.

Preferably, the solid-particles stabilized emulsion has a viscosity at 20° C. in the range of 5 to 30 mPa·s under shear rate of 10/s, more preferably in the range of 5 to 20 mPa·s under shear rate of 10/s determined according to DIN 53019.

The solid particles-stabilized emulsions disclosed herein are preferably used to recover crude oil. Such oils, by nature of their composition, usually contain sufficient asphaltenes and polar hydrocarbons, which will help stabilize the solid particles-stabilized emulsion.

"Crude oil" is defined as a mixture of hydrocarbons that existed in liquid phase in underground reservoirs and remains liquid at atmospheric pressure after passing through surface separating facilities and which has not been processed through a crude oil distillation tower.

Most preferably the oil is crude oil having an API gravity in the range between 20° API and 40° API. Such oils, by nature of their composition, usually contain asphaltenes and polar hydrocarbons.

Most preferably the crude oil is crude oil having a a viscosity in the range of 1 to 5000 mPa·s, more preferably in the range of 10 to 1000 mPa·s, most preferably in the range of 25 to 500 mPa·s, each at a temperature of 20° C. according to DIN 53019.

An emulsion is a heterogeneous liquid system involving two immiscible phases, with one of the phases being intimately dispersed in the form of droplets in the second phase. The matrix of an emulsion is called the external or continuous phase, while the portion of the emulsion that is in the form of droplets is called the internal, dispersed or discontinuous phase.

A solid particles-stabilized emulsion according to the present invention is an emulsion that is stabilized by solid particles which adsorb onto the interface between two phases, for example an oil phase and a water phase.

The term "solid" means a substance in its most highly concentrated form, i.e., the atoms or molecules comprising the substance are more closely packed with one another relative to the liquid or gaseous states of the substance.

The "particle" of the present invention can have any shape, for example a spherical, cylindrical, a circular or cuboidal shape.

Subterranean oil-containing formation can be tar sand.

"Surface facility" means any facility configured to receive production fluids. The facility may be at or near the wellhead, or may be downstream. The facility may be on land, on a floating platform, or on a vessel.

"Oil" means a fluid containing a mixture of condensable hydrocarbons.

"Hydrocarbons" are organic material with molecular structures containing carbon and hydrogen.

The term "wellbore" refers to a hole in a formation made by drilling or insertion of a conduit into the formation. A wellbore may have a substantially circular cross section, or other cross-sectional shapes (e.g., circles, ovals, squares, rectangles, triangles, slits, or other regular or irregular shapes). As used herein, the terms "well" and "opening," when referring to an opening in the formation may be used interchangeably with the term "wellbore."

Preferably the solid particles-stabilized emulsion comprises 10.0 to 90.0% by weight water, 10.0 to 90.0% by weight oil and 0.01 to 10.0% by weight of at least one layered double hydroxide of general formula (I), more preferably 50.0 to 90.0% by weight water, 10.0 to 50.0% by weight oil and 0.01 to 5.0% by weight of at least one layered double hydroxide of general formula (I), most preferably 70.0 to 90.0% by weight water, 10.0 to 30.0% by weight oil and 0.01 to 2.5% by weight of at least one layered double hydroxide of general formula (I), in each case related to the overall weight of the emulsion. Even more preferably the solid particles-stabilized emulsion comprises 70.0 to 90.0% by weight water, 10.0 to 30.0% by weight oil and 0.01 to 1.0% by weight of at least one layered double hydroxide of general formula (I), related to the overall weight of the emulsion.

Layered double hydroxides of general formula (I) (LDH) comprise an unusual class of layered materials with positively charged layers and charge balancing anions located in the interlayer region. This is unusual in solid state chemistry: many more families of materials have negatively charged layers and cations in the interlayer spaces (e.g. kaolinite, $Al_2Si_2O_5(OH)_4$).

Preferably the at least one layered double hydroxide is represented by the general formula (I)

$$[M^{II}_{(1-x)}M^{III}_{x}(OH)_2]^{x+}[A^{n-}]_{x/n}\cdot yH_2O \qquad (I),$$

wherein $M^{II}$ denotes a divalent metal ion selected from the group consisting of Ca, Mg, Fe, Ni, Zn, Co, Cu and Mn or 2Li, $M^{III}$ denotes a trivalent metal ion selected from the group consisting of Al, Fe, Cr and Mn, $A^{n-}$ denotes an n-valent anion selected from the group consisting of $Cl^-$, $Br^-$, $NO_3^-$, $CO_3^{2-}$, $SO_4^{2-}$ and $SeO_4^{2-}$, x is the mole fraction having a value ranging from 0.1 to 0.5 and y is a value ranging from 0 to 5.0.

More preferably the at least one layered double hydroxide is represented by the general formula (I)

$$[M^{II}_{(1-x)}M^{III}_{x}(OH)_2]^{x+}[A^{n-}]_{x/n}\cdot yH_2O \qquad (I),$$

wherein $M^{II}$ denotes Mg, $M^{III}$ denotes a trivalent metal ion selected from the group consisting of Al and Fe, $A^{n-}$ denotes an n-valent anion selected from the group consisting of $Cl^-$, $Br^-$, $NO_3^-$, $CO_3^{2-}$, $SO_4^{2-}$ and $SeO_4^{2-}$, x is the mole fraction having a value ranging from 0.1 to 0.5 and y is a value ranging from 0 to 5.0.

Preferably x is the mole fraction having a value ranging from 0.2 to 0.33.

Examples of the at least one layered double hydroxide of general formula (I) include hydrotalcite [$Mg_6Al_2(CO_3)(OH)_{16}.4(H_2O)$], manasseite [$Mg_6Al_2(CO_3)(OH)_{16}.4(H_2O)$], pyroaurite [$Mg_6Fe_2(CO_3)(OH)_{16}.4.5(H_2O)$], sjoegrenite [$Mg_6Fe_2(CO_3)(OH)_{16}.4.5(H_2O)$], stichtite [$Mg_6Cr_2(CO_3)(OH)_{16}.4(H_2O)$], barbertonite [$Mg_6Cr_2(CO_3)(OH)_{16}.4(H_2O)$], takovite, reevesite [$Ni_6Fe_2(CO_3)(OH)_{16}.4(H_2O)$], desautelsite [$Mg_6Mn_2(CO_3)(OH)_{16}CO_3.4(H_2O)$], motukoreaite, wermlandite, meixnerite, coalingite, chlormagaluminite, carrboydite, honessite, woodwardite, iowaite, hydrohonessite and mountkeithite. More preferably the at least one layered double hydroxide of general formula (I) is selected from the group consisting of hydrotalcite [$Mg_6Al_2(CO_3)(OH)_{16}.4(H_2O)$], manasseite [$Mg_6Al_2(CO_3)(OH)_{16}.4(H_2O)$], pyroaurite [$Mg_6Fe_2(CO_3)(OH)_{16}.4.5(H_2O)$], sjoegrenite [$Mg_6Fe_2(CO_3)(OH)_{16}.4.5(H_2O)$], stichtite [$Mg_6Cr_2(CO_3)(OH)_{16}.4(H_2O)$], barbertonite [$Mg_6Cr_2(CO_3)(OH)_{16}.4(H_2O)$], takovite, reevesite [$Ni_6Fe_2(CO_3)(OH)_{16}.4(H_2O)$] and desautelsite [$Mg_6Mn_2(CO_3)(OH)_{16}CO_3.4(H_2O)$]. More preferably the at least one layered double hydroxide is selected from the group consisting of hydrotalcite [$Mg_6Al_2(CO_3)(OH)_{16}.4(H_2O)$], manasseite [$Mg_6Al_2(CO_3)(OH)_{16}.4(H_2O)$], pyroaurite [$Mg_6Fe_2(CO_3)(OH)_{16}.4.5(H_2O)$] and sjoegrenite [$Mg_6Fe_2(CO_3)(OH)_{16}.4.5(H_2O)$].

The solid particles are made of layered double hydroxide of general formula (I). The actual average particle size should be sufficiently small to provide adequate surface area coverage of the internal oil phase. Preferably the solid particles have an average particle size in the range of 30 nm to 10 μm, more preferably in the range of 30 nm to 2 μm and more most preferably in the range of 50 nm to 100 nm, determined according to SEM images (as defined under Method A).

Preferably, the aspect ratio of the solid particles which are made of layered double hydroxide of general formula (I) is in the range of 1 to 30, more preferably in the range of 1 to 20, most preferably in the range of 1 to 10, even more preferably in the range of 2 to 8, whereby the aspect ratio is defined as diameter/thickness. The diameter and the thickness are determined according to SEM images (as defined under Method A).

Preferably, the solid particles have a BET surface area in the range of 50 to 400 $m^2/g$, more preferably in the range of 80 to 130 $m^2/g$, according to DIN 66315 at 77 K.

Preferably, the solid particles remain undissolved in the water phase under the inventively used conditions, but have appropriate charge distribution for stabilizing the interface between the internal droplet phase, i.e. oil, and the external continuous phase, i.e. water, to make a solid particles-stabilized oil-in-water emulsion.

Preferably, the solid particles are hydrophilic for making an oil-in-water emulsion. Thereby, the particles are properly wetted by the continuous phase, i.e. water, that holds the discontinuous phase. The appropriate hydrophilic character may be an inherent characteristic of the solid particles or either enhanced or acquired by treatment of the solid particles.

In the scope of the present invention, "hydrophilic" means that the surface of a corresponding "hydrophilic" solid particle has a contact angle with water against air of <90°. The contact angle is determined according to methods that are known to the skilled artisan, for example using a standard-instrument (Dropshape Analysis Instrument, Fa. Kruss DAS 10). A shadow image of the droplet is taken using a CCD-camera, and the shape of the droplet is acquired by computer aided image analysis. These measurements are conducted according to DIN 5560-2.

Preferably the droplets that are present in the oil-in-water emulsion have an average droplet size $Dv_{50}$ in the range of 1 to 40 μm, more preferably in the range of 5 to 40 μm and most preferably in the range of 5 to 30 μm, determined according to ISO13320. $Dv_{50}$ is defined as the volume median diameter at which 50% of the distribution is contained in droplets that are smaller than this value while the other half is contained in droplets that are larger than this value.

Preferably the droplets that are present in the oil-in-water emulsion have an average droplet size $Dv_{90}$ in the range of 40 to 100 μm, more preferably in the range of 40 to 80 μm and most preferably in the range of 40 to 50 μm, determined according to ISO13320. $Dv_{90}$ is defined as the diameter at which 90% of the distribution is contained in droplets that are smaller than this value while 10% is contained in droplets that are larger than this value.

In a preferred embodiment, the presently claimed invention relates to a process for recovering oil from a subterranean oil-containing formation comprising at least the steps of:

a) introducing solid particles and water into the subterranean oil-containing formation to obtain solid particles-stabilized emulsion containing droplets, whereby water is the continuous phase and oil is the dispersed phase, and b) recovering said solid particles-stabilized emulsion from the subterranean oil-containing formation, whereby the solid particles are hydrophilic solid particles selected from the group consisting of hydrotalcite [$Mg_6Al_2(CO_3)(OH)_{16}.4(H_2O)$], manasseite [$Mg_6Al_2(CO_3)(OH)_{16}.4(H_2O)$], pyroaurite [$Mg_6Fe_2(CO_3)(OH)_{16}.4.5(H_2O)$], sjoegrenite [$Mg_6Fe_2(CO_3)(OH)_{16}.4.5(H_2O)$], stichtite [$Mg_6Cr_2(CO_3)(OH)_{16}.4(H_2O)$], barbertonite [$Mg_6Cr_2(CO_3)(OH)_{16}.4(H_2O)$], takovite, reevesite [$Ni_6Fe_2(CO_3)(OH)_{16}.4(H_2O)$], desautelsite [$Mg_6Mn_2(CO_3)(OH)_{16}CO_3.4(H_2O)$], motukoreaite, wermlandite, meixnerite, coalingite, chlormagaluminite, carrboydite, honessite, woodwardite, iowaite, hydrohonessite and mountkeithite.

Preferably the solid particles-stabilized emulsion contains surfactants. The surfactant can be an anionic, zwitterionic or amphoteric, nonionic or cationic surfactant, or a mixture of two or more of these surfactants. Examples of suitable anionic surfactants include carboxylates, sulfates, sulfonates, phosphonates, and phosphates. Examples of suitable nonionic surfactants include alcohol ethoxylates, alkyl phenol ethoxylates, fatty acid ethoxylates, sorbitan esters and their ethoxylated derivatives, ethoxylated fats and oils, amine ethoxylates, ethylene oxide-propylene oxide copolymers, surfactants derived from mono- and polysaccharides such as the alkyl polyglucosides, and glycerides. Examples of suitable cationic surfactants include quaternary ammonium compounds. Examples of zwitterionic or amphoteric surfactants include N-alkyl betaines or other surfactants derived from betaines.

Preferably, the water used for recovering oil contains ions. Preferably, the total ion concentration is in the range of 3000 to 300000 mg/l, more preferably the total ion concentration is in the range of 100000 to 250000 mg/l, most preferably the total ion concentration is in the range of 200000 to 220000 mg/l.

Preferably the solid particles-stabilized emulsion has a conductivity in the range of 50 to 190 mS/cm, more preferably in the range of 130 to 160 mS/cm.

Preferably the viscosity of the solid particles-stabilized emulsion is in the range of 5 to 30 mPa·s at a temperature of 20° C. under shear rate of 10/s according to DIN 53019, more preferably in the range of 5 to 20 mPa·s at a temperature of 20° C. under shear rate of 10/s according to DIN 53019.

As the solid particles-stabilized emulsion has a low viscosity, this emulsion is not used (a) as drive fluids to displace oils too viscous to be recovered efficiently by waterflooding in non-thermal (or "cold flow") or thermal applications;

(b) to fill high permeability formation zones for "profile modification" applications to improve subsequent waterflood performance;

(c) to form effective horizontal barriers to vertical flow of water or gas to reduce coning of the water or gas to the oil producing zone of a well.

The solid particles are added in an amount that is sufficient to stabilize an oil-in-water emulsion. Preferably, the solid particles are added in an amount of 0.01 to 10 g in relation to 100 ml water, more preferably in amount of 0.01 to 5.0 g in relation to 100 ml water, most preferably in an amount of 0.01 to 2.5 g in relation to 100 ml water, i.e. water containing preferably 0.01 to 10 weight-%, more preferably 0.01 to 5.0 weight-%, most preferably 0.01 to 2.5 weight-% solid particles is added.

Preferably, the oil used for making the solid particles-stabilized emulsion contains a sufficient amount of asphaltenes, polar hydrocarbons, or polar resins to help stabilize the solid particles-oil interaction.

The solid particles-stabilized emulsion containing droplets, whereby water is the continuous phase and oil is the dispersed phase, i.e. an oil-in-water emulsion, is formed in the oil-containing formation. Preferably the oil-in-water emulsion is formed at a temperature in the range of 30 to 200° C., more preferably in the range of 40 to 150° C., most preferably in the range of 50 to 100° C. Emulsification is effected by a sufficient amount of mixing energy which results from the shear in the oil-containing formation. In other words, mixing is naturally accomplished by flow of the fluids through the porous rocks.

The subterranean oil-containing formation has pores and the solid particles-stabilized emulsion is obtained by transporting the solid particles and water through these pores.

The formations have an absolute permeability that is sufficiently high so that the pore throats are large enough to allow individual droplets to pass through the pores unimpeded. The lower limit on permeability is thus dependent not only on the rock pore structure, but also on the droplet size distribution in the emulsion. For most applications, rock permeability is not expected to be a limiting factor. For example, many formation rocks containing heavy oil deposits have an absolute permeability of from $3.0*10^{-13}$ to $1.5*10^{-11}$ m². Such rocks have pore throats with average diameters of from 20 to 200 μm. Droplets sizes in emulsions formed in these rocks are ranging in diameters that are smaller the average diameter of the pore throats, thus the droplets should not be impeded in flow through such rocks.

The lower limit of rock permeability to allow flow of a specific solid particles-stabilized emulsion can be determined in laboratory tests by flowing said emulsion through a series of rocks of decreasing, but known, absolute permeability. Procedures for conducting such core flow tests are easily known to those skilled in the art, but involve measuring pressure drops across the core at measured flow rates and determining whether the emulsion is trapped within the rock pores or passes unimpeded through the rock. An exact lower limit for application of such solid particles-stabilized emulsions is determined to be below $1.5*10^{-11}$ m² for emulsions having average droplet diameters $Dv_{50}$ of less than 5 μm. Such core flood tests conducted in rock representative of the target formation application are currently the best method for determining whether the droplet size distribution of the emulsion is sufficiently small to allow emulsion flow without trapping of droplets at pore throats.

In order to separate the oil and water, the oil-in-water emulsion is treated with chemicals. These chemicals are referred to as dehydration chemicals or demulsifiers. Demulsifiers allow the dispersed droplets of the emulsion to coalesce into larger drops and settle out of the matrix. For example, U.S. Pat. No. 5,045,212; U.S. Pat. No. 4,686,066; and U.S. Pat. No. 4,160,742 disclose examples of chemical demulsifiers used for breaking emulsions. In addition, commercially available chemical demulsifiers, such as ethoxylated-propoxylated phenolformaldehyde resins and ethoxylated-propoxylated alcohols, are known for demulsification of crude oils. Such demulsifiers further minimize the amount of heat and settling time otherwise required for separation. However, the effectiveness of these demulsifiers on heavy crude oils, particularly those containing asphaltenes, naphthenic acids and inorganic solids may be limited.

Where the oil is heavy oil, it is typical to also employ electrostatic separators. Gravity settling and centrifugation in conjunction with chemical demulsifiers have also been employed.

It is also a known practice to increase the temperature of operation of separators in an attempt to break water/oil emulsions. U.S. Pat. No. 4,938,876 discloses a method for separating oil, water and solids from emulsions by heating the emulsion to about 115° C., rapidly cooling the mixture to below 100° C., separating the solids from the liquids and then separating the water from the oil. The patent further discloses the addition of a flocculant prior to cooling the mixture.

In some known technologies for breaking emulsions, an intermediate emulsion rag layer is produced. Further processing of the rag layer may be utilized to recover the oil and discharge the water. Recently, a microwave technology has been disclosed in U.S. Pat. No. 6,086,830 and U.S. Pat. No. 6,077,400. This microwave technology uses microwaves to treat hard-to-treat emulsions, especially for the rag layer.

EXAMPLES

Methods

Emulsion Characterization

Stability

The stability of emulsion was determined by comparing the height of emulsion phases just after forming and after a certain time.

A picture of emulsion was taken with digital camera right after making an emulsion, and after 1 hour, 24 hours, and 1 week. The height of emulsion gradually decreased due to creaming of emulsion phase. Stability of emulsion is defined as a ratio of the height of emulsion phase right after making an emulsion and that of after 24 hours.

Type

The type of emulsion (oil in water type or water in oil type) was determined by conductivity measurement.

After 24 hours from making an emulsion, the conductivity of emulsion was measured with a conductivity meter (LF330, Wissenschaftlich-Technische Werkstätten GmbH). When conductivity of an emulsion is more than 10 μS/cm, it indicates that the emulsion is oil in water type. When conductivity of an emulsion is less than 10 μS/cm, it indicates that the emulsion is water in oil type (Langmuir 2012, 28, 6769-6775).

Droplet Size

Droplet size of emulsion was measured by the laser diffraction in accordance to ISO13320. The value of $Dv_{50}$ was used for comparison.

Viscosity

Viscosity was measured by a rotational viscosity meter at 20° C. and 60° C. in accordance to DIN 53019.

Temperature and Shearing Experiment

The stability of emulsion phase under temperature and shearing was determined according to the following procedure: 100 ml of as-made emulsion was poured into a transparent autoclave, and the autoclave was heated to 60° C. and kept for 6 days under continuous stirring (800 U/min).

$N_2$ adsorption desorption isotherms: Langmuir surface areas, BET surface areas, micropore volume, pore volume, micropore size were measured via nitrogen adsorption at 77 K according to DIN 66134 (BET) and DIN 66135 ($N_2$ adsorption). The micropore volume was determined from the t-plot analysis.

X-ray powder diffraction: The determinations of the crystallinities were performed on a D8 Advance series 2 diffractometer from Bruker AXS. The diffractometer was configured with an opening of the divergence aperture of 0.1° and a Lynxeye detector. The samples were measured in the range from 2° to 70° (2 Theta). After baseline 30 correction, the reflecting surfaces were determined by making use of the evaluation software EVA (from Bruker AXS). The ratios of the reflecting surfaces are given as percentage values.

SEM (Method A)

Powder samples were investigated with the field emission scanning electron microscope (FESEM) Hitachi S-4700, which was typically run at acceleration voltages between 2 kV and 20 kV. Powder samples were prepared on a standard SEM stub and sputter coated with a thin platinum layer, typically 5 nm. The sputter coater was the Polaron SC7640. The sizes of LDH particles, diameter and thickness, were counted manually from SEM images. 50 particles were picked up randomly, and their sizes were measured. The averages were defined by the particle sizes. Aspect ratio was determined as the ratio of diameter/thickness.

Cryo-SEM (Method B)

Aqueous dispersions were investigated with the field emission scanning electron microscope (FESEM) Hitachi S-4700, which was typically run at acceleration voltages between 2 kV and 20 kV. For the investigation of aqueous dispersions a dedicated cryo equipment from Leica Microsystems is used. Dispersions were shock frozen by immersion in liquid ethane. The frozen hydrated samples were fractured in the MED 020 modular vacuum system fitted with a freeze fracture unit. After freeze etching and Pt sputter coating the frozen samples were transferred with the shuttle VCT100 into the SEM, which is equipped with a cryo-stage. To achieve a high surface sensitivity, avoid beam damage and minimize charging Cryo-SEM imaging was performed at 2 kV.

Elemental Analysis

Composition of the obtained materials is measured with flame atomic absorption spectrometry (F-AAS) and inductively coupled plasma optical emission spectrometry (ICP-OES).

Preparation of Layered Double Hydroxides

Example 1

Synthesis of Hydrotalcite ($Mg^{2+}$, $Al^{3+}$, $CO_3^{2-}$)

Solution A: $Mg(NO_3)_2.6H_2O$ and $Al—(NO_3)_3.9H_2O$ were dissolved in deionized water (562.5 ml).

Solution B: NaOH and $Na_2CO_3$ were dissolved in deionized water (562.5 ml) to form the mixed base solution. Solution A (562.5 ml) and solution B (562.5 ml) were simultaneously added (5 sec.) under stirring to a vessel containing deionized water (450 ml). The pH of the reaction mixture was around 8.55-8.6. The mixing process was carried out at room temperature. The resulting slurry was transferred to an autoclave and aged at 100° C. for 13 h while stirring (150 U/min). The pH of resulting slurry was 8.38. The slurry was filtered, washed well with 23 L of deionized water, and dried at 120° C. overnight.

Figure 2:
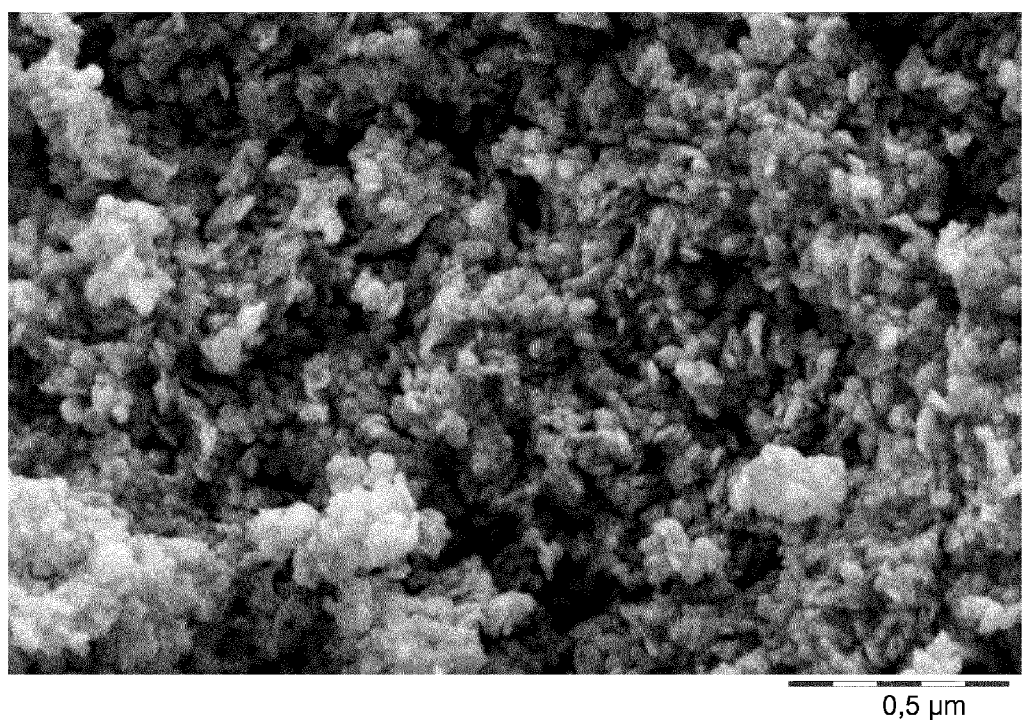
FIG. 2 is an SEM image of the final product of Example 1.

The characterization of the final product by XRD as shown in FIG. 1 and table 1 shows that the product has the typical layered double hydroxide structure. The SEM image (FIG. 2) shows that the product is a disk shaped material with the diameter of around 50 nm, the thickness of 10-20 nm, and the aspect ratio of 2.5-5. The elemental analysis indicated an elemental composition of Mg (23.0 wt. %) and Al (8.2 wt. %). The $N_2$ adsorption isotherm measurements indicated that the material has BET surface area of 106.3 $m^2/g$.

TABLE 1

| Number | Angle | d-Spacing | Rel. Intensity |
|---|---|---|---|
| 1 | 11.30 | 7.82 | 100% |
| 2 | 15.20 | 5.83 | 3% |
| 3 | 22.82 | 3.89 | 77% |
| 4 | 26.84 | 3.32 | 3% |
| 5 | 30.72 | 2.91 | 5% |
| 6 | 34.43 | 2.60 | 59% |
| 7 | 38.48 | 2.34 | 29% |
| 8 | 45.54 | 1.99 | 26% |
| 9 | 60.36 | 1.53 | 70% |
| 10 | 61.63 | 1.50 | 69% |
| 11 | 65.42 | 1.43 | 12% |

Example 2

Synthesis of hydrotalcite-like compound ($Mg^{2+}$, $Fe^{3+}$, $CO_3^{2-}$) Solution A: $Mg(NO_3)_2.6H_2O$ and $Fe—(NO_3)_3.9H_2O$ were dissolved in deionized water (562.5 ml). Solution B: NaOH and $Na_2CO_3$ were dissolved in deionized water (562.5 ml) to form the mixed base solution. Solution A (562.5 ml) and solution B (562.5 ml) were simultaneously added dropwise to a vessel containing stirred deionized water (450 ml). The pH of the reaction mixture was around 10.6. The mixing process was carried out at room temperature. The resulting slurry was transferred to autoclave and aged at 100° C. for 13 h with 150 U/min stirring. The pH of resulting slurry was 9.5. The slurry was washed well with deionized water with normal filter, and dried at 120° C. overnight.

Figure 3:
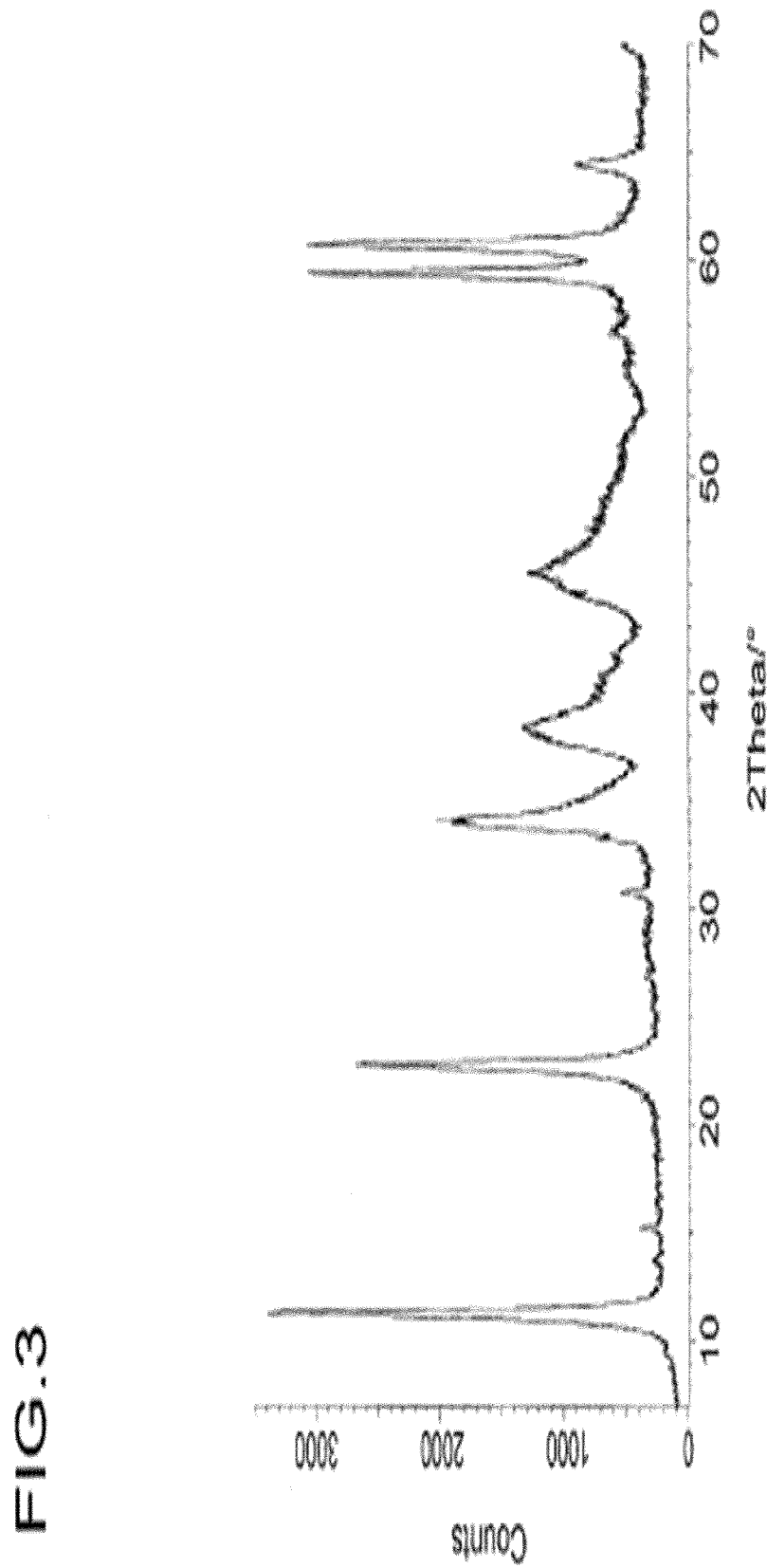
FIG. 3 is an XRD of the final product of Example 2.
Figure 4:
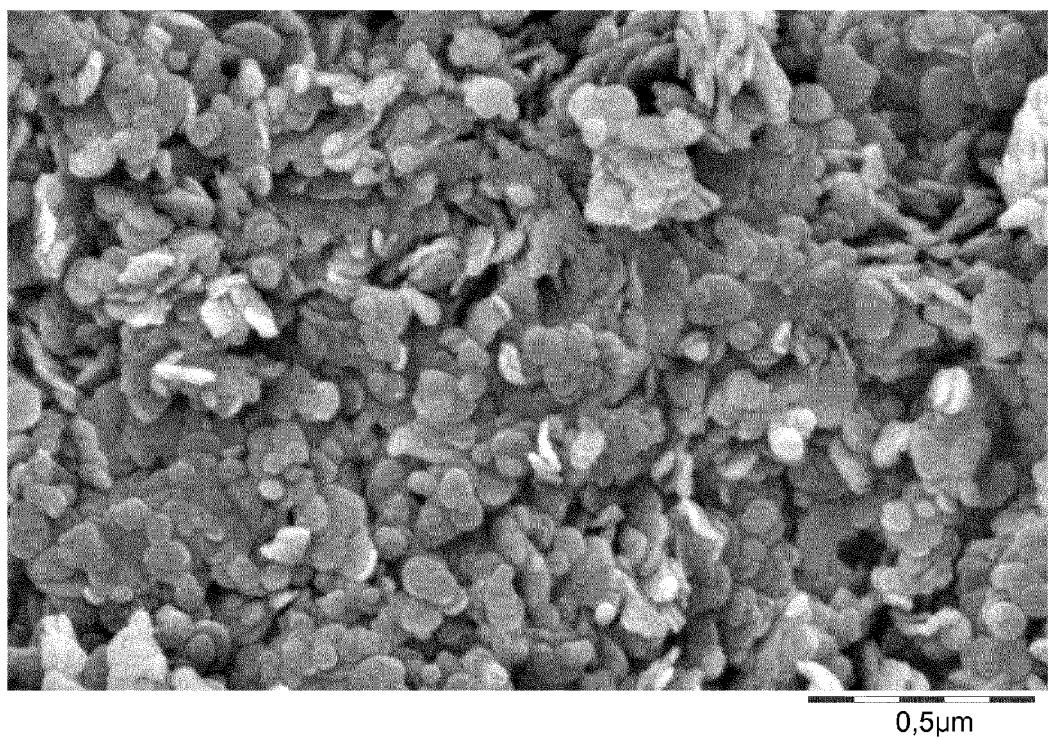
FIG. 4 is an SEM image of the final product of Example 2.

The characterization of the final product by XRD as shown in FIG. 3 and table 2 shows that the product has the typical layered double hydroxide structure characteristic. The SEM image (FIG. 4) shows that the product is a disk shaped material with the diameter of 30-180 nm, the thickness of around 15 nm, and aspect ratio of 2-12. The elemental analysis indicated an elemental composition of Mg (21.7 wt. %) and Fe (12.6 wt. %). The $N_2$ adsorption isotherm measurements indicated that the material has BET surface area of 71.0 $m^2/g$.

TABLE 2

| Number | Angle | d-Spacing | Rel. Intensity |
|---|---|---|---|
| 1 | 11.24 | 7.87 | 100% |
| 2 | 15.20 | 5.82 | 6% |
| 3 | 22.67 | 3.92 | 75% |
| 4 | 26.83 | 3.32 | 2% |
| 5 | 30.76 | 2.90 | 7% |
| 6 | 34.00 | 2.63 | 44% |
| 7 | 38.29 | 2.35 | 24% |
| 8 | 45.51 | 1.99 | 20% |
| 9 | 59.38 | 1.56 | 78% |
| 10 | 60.66 | 1.53 | 77% |
| 11 | 64.42 | 1.45 | 15% |

Comparative Example 1

Commercial Laponite®

Laponite® was provided by Rockwood Additives Ltd.

Preparation of Emulsions

For evaluating the obtained materials as emulsifier, emulsion test was performed on the inventive hydrotalcites of example 1 as well as on the commercial Laponite®. The condition of emulsion test is as follows:

n-undecane ($C_{11}H_{24}$, Merck, min 99%, 1 L=0.74 kg, 1,579 mPa·s@20° C.)

mineral oil (PIONIER 1912, H&R Vertrieb GmbH, 31.4 mPa·s@20° C.)

mineral oil (WIOLTAN SHH 70, H&R Vertrieb GmbH, 222 mPa·s@20° C.)

mineral oil (TUDALEN 900 NF, H&R Vertrieb GmbH, 783.3 mPa·s@20° C.)

crude oil (Wintershall Holding GmbH, 226 mPa·s@20° C.)

x: 0.1, 1, 2.5, 1.0 y: 10, 50, 90 z: (100-y) ml x g of sample and y ml of oil were added to z ml of deionized water. The suspension was heated at 60° C. for 1 hour with stirring. After heating, the suspension was stirred with Ultra-turrax with 15*10³ rpm for 3 minutes. Salt water was obtained by dissolving 56429.0 mg of $CaCl_2 \cdot 2H_2O$, 22420.2 mg of $MgCl_2 \cdot 6H_2O$, 132000.0 mg of NaCl, 270.0 mg of $Na_2SO_4$, and 380.0 mg of $NaBO_2 \cdot 4H_2O$ to 1 L of deionized water, adjusting pH to 5.5-6.0 with HCl afterwards.

<Emulsion 1>

The compositions of emulsion 1 are as follows: 1 g of hydrotalcite ($Mg^{2+}$, $Al^{3+}$, $CO_3^{2-}$), 10 ml of n-undecane ($C_{11}H_{24}$, Merck, min 99%, 1 L=0.74 kg, 1,579 mPa·s@20° C.), and 90 ml of salt water. The stability of the emulsion 1 is 45.9% height after 24 hours. The conductivity of this emulsion was 145 mS/cm which indicates that this emulsion is oil in water type. The results of laser diffraction indicates that this emulsion has $Dv_{50}$ of 13.1 μm. The viscosity was 8 mPa·s@20° C. and 7 mPa·s@60° C. (under shear rate of 10/s).

<Emulsion 2>

The compositions of emulsion 2 are as follows: 1 g of hydrotalcite ($Mg^{2+}$, $Al^{3+}$, $CO_3^{2-}$), 10 ml of mineral oil (PIONIER 1912, H&R Vertrieb GmbH, 31.4 mPa·s@20° C.), and 90 ml of salt water. The stability of the emulsion 2 is 47.2% height after 24 hours. The conductivity of this emulsion was 148 mS/cm which indicates that this emulsion is oil in water type. The results of laser diffraction indicates that this emulsion has $Dv_{50}$ of 13.6 μm. The viscosity was 10 mPa·s@20° C. and 9 mPa·s@60° C. (under shear rate of 10/s).

<Emulsion 3>

The compositions of emulsion 3 are as follows: 1 g of hydrotalcite ($Mg^{2+}$, $Al^{3+}$, $CO_3^{2-}$), 10 ml of mineral oil (WIOLTAN SHH 70, H&R Vertrieb GmbH, 222 mPa·s@20° C.), and 90 ml of salt water.

The stability of the emulsion 3 is 43.5% height after 24 hours. The conductivity of this emulsion was 151 mS/cm which indicates that this emulsion is oil in water type. The results of laser diffraction indicates that this emulsion has $Dv_{50}$ of 23.0 μm. The viscosity was 8 mPa·s@20° C. and 9 mPa·s@60° C. (under shear rate of 10/s).

<Emulsion 4>

The compositions of emulsion 4 are as follows: 1 g of hydrotalcite ($Mg^{2+}$, $Al^{3+}$, $CO_3^{2-}$), 10 ml mineral oil (TUDALEN 900 NF, H&R Vertrieb GmbH, 783.3 mPa·s@20° C.), and 90 ml of salt water.

The stability of the emulsion 4 is 44.3% height after 24 hours. The conductivity of this emulsion was 149 mS/cm which indicates that this emulsion is oil in water type. The results of laser diffraction indicates that this emulsion has $Dv_{50}$ of 34.4 μm. The viscosity was 10 mPa·s@20° C. and 8 mPa·s@60° C. (under shear rate of 10/s).

<Emulsion 5>

The compositions of emulsion 5 are as follows: 1 g of hydrotalcite ($Mg^{2+}$, $Al^{3+}$, $CO_3^{2-}$), 10 ml of crude oil (Wintershall Holding GmbH, 226 mPa·s@20° C.), and 90 ml of salt water. The stability of the emulsion 5 is 38.9% height after 24 hours. The conductivity of this emulsion was 152 mS/cm which indicates that this emulsion is oil in water type. The results of laser diffraction indicates that this emulsion has $Dv_{50}$ of 24.9 μm. The viscosity was 6 mPa·s@20° C. and 6 mPa·s@60° C. (under shear rate of 10/s).

<Emulsion 6>

The compositions of emulsion 6 are as follows: 1 g of hydrotalcite ($Mg^{2+}$, $Fe^{3+}$, $CO_3^{2-}$), 10 ml of mineral oil (PIONIER 1912, H&R Vertrieb GmbH, 31.4 mPa·s@20° C.), and 90 ml of salt water. The stability of the emulsion 6 is 50.9% height after 24 hours. The conductivity of this emulsion was 151 mS/cm which indicates that this emulsion is oil in water type. The results of laser diffraction indicates that this emulsion has $Dv_{50}$ of 13.7 μm. The viscosity was 20 mPa·s@20° C. and 23 mPa·s@60° C. (under shear rate of 10/s).

<Emulsion 7 (Emulsion for Comparative Example)>

The compositions of emulsion 7 are as follows: 1 g of commercial Laponite® [negatively charged layers and cations in the interlayer spaces], 10 ml of mineral oil (PIONIER 1912, H&R Vertrieb GmbH, 31.4 mPa·s@20° C.), and 90 ml of salt water.

The stability of the emulsion 7 is 29.2% height after 24 hours. The conductivity of this emulsion was 149 mS/cm which indicates that this emulsion is oil in water type. The results of laser diffraction indicates that this emulsion has $Dv_{50}$ of 16.1 μm. The viscosity was 88 mPa·s@20° C. and 51 mPa·s@60° C. (under shear rate of 10/s).

<Emulsion 8 (Emulsion for Comparative Example)>

The compositions of emulsion 8 are as follows: 1 g of commercial Laponite® [negatively charged layers and cations in the interlayer spaces], 10 ml of crude oil (Wintershall Holding GmbH, 226 mPa·s@20° C.), and 90 ml of salt water.

The stability of the emulsion 8 is 42.1% height after 24 hours. The conductivity of this emulsion was 138 mS/cm which indicates that this emulsion is oil in water type. The results of laser diffraction indicates that this emulsion has $Dv_{50}$ of 26.3 μm. The viscosity was 117 mPa·s@20° C. and 73 mPa·s@60° C. (under shear rate of 10/s).

Stability and Permeability of the Emulsions

Sandpacked Column Experiments

Flow of the emulsion through porous media, i.e. sandstone or packed sand is essential for practical application. The following experiments allow us to examine the permeability of the obtained emulsion.

A cylinder with height of 200 mm and diameter of 15 mm was used for a vessel. Sand provided by Wintershall (Well: Bockstedt-83) was put into the cylinder until its height be 100 mm. The sand was not pretreated with water and/or oil. After that, 50 ml of emulsion was poured into the cylinder with 20 ml/min. The amounts of emulsion which went through the sand and droplet size of the emulsion were used as a measure of the ability of the emulsion to flow through the packed column without destruction of the emulsion.

Example 3

The sandpacked column experiment was carried out with emulsion 2 as described above. $Dv_{50}$ of 13.6 μm was measured before passing through the column. $Dv_{50}$ of 13.8 μm was measured after passing through the column. 31.4% of the emulsion were recollected after passing through the column.

Example 4

The sandpacked column experiment was carried out with emulsion 6 as described above. $Dv_{50}$ of 13.7 μm was measured before passing through the column. $Dv_{50}$ of 13.8 μm was measured after passing through the column. 57.6% of the emulsion were recollected after passing through the column.

Example 5 (Comparative)

The sandpacked column experiment was carried out with emulsion 7 as described above. $Dv_{50}$ of 16.1 μm was measured before passing through the column. $Dv_{50}$ of 17.6 μm was measured after passing through the column. 15% of the emulsion were recollected after passing through the column.

The invention claimed is:

1. A process for recovering oil from a subterranean oil-containing formation comprising at least the steps of:
   a) introducing solid particles and water into the subterranean oil-containing formation to obtain a solid particles-stabilized emulsion containing droplets, whereby water is the continuous phase and oil is the dispersed phase, and
   b) recovering said solid particles-stabilized emulsion from the subterranean oil-containing formation,
   wherein the solid particles comprise at least one layered double hydroxide of general formula (I)

$$[M^{II}_{(1-x)}M^{III}_{x}(OH)_2]^{x+}[A^{n-}]_{x/n}\cdot yH_2O \qquad (I),$$

wherein
$M^{II}$ denotes a divalent metal ion or 2Li,
$M^{III}$ denotes a trivalent metal ion,
$A^{n-}$ denotes an n-valent anion,
n is 1 or 2,
x is the mole fraction having a value ranging from 0.1 to 0.5 and
y is a value ranging from 0 to 5.0;
wherein the solid-particles stabilized emulsion has a viscosity at 20° C. in the range of 5 to 30 mPa·s at a temperature of 20° C. under shear rate of 10/s.

2. The process according to claim 1, wherein the solid particles have an average particle size in the range of 30 nm to 10 μm.

3. The process according to claim 1, wherein that the droplets have an average droplet size $Dv_{50}$ in the range of 1 to 40 μm.

4. The process according to claim 1, wherein that the droplets have an average droplet size $Dv_{90}$ in the range of 10 to 30 μm.

5. The process according to claim 1, wherein the subterranean oil-containing formation has pores and the solid particles-stabilized emulsion is obtained by transporting the solid particles and water through these pores.

6. The process according to claim 1, wherein the solid particles are hydrophilic.

7. The process according to claim 1, wherein the solid particles-stabilized emulsion comprises 10 to 90% by weight water, 10 to 90% by weight oil and 0.1 to 10% by weight of at least one layered double hydroxide of general formula (I), related to the overall weight of the emulsion.

8. The process according to claim 1, wherein the oil is crude oil.

9. The process according to claim 1, wherein the oil is crude oil having a viscosity in the range of 1 to 5000 mPa·s at a temperature of 20° C.

10. The process according to claim 1, wherein
the divalent metal ion is Ca, Mg, Fe, Ni, Zn, Co, Cu or Mn,
the trivalent metal ion is Al, Fe, Cr or Mn,
the n-valent anion is $Cl^-$, $Br^-$, $NO_3^-$, $CO_3^{2-}$, $SO_4^{2-}$ or $SeO_4^{2-}$,
x is the mole fraction having a value ranging from 0.1 to 0.5 and
y is a value ranging from 0 to 5.0.

11. The process according to claim 1, wherein the solid particles-stabilized emulsion has a conductivity in the range of 50 to 190 mS/cm.

12. The process according to claim 1, wherein the aspect ratio of the solid particles is in the range of 1 to 30.

13. The process according to claim 1, wherein upon introduction of the solid particles and water into the subterranean oil-containing formation, the solid particles and water transport into pores of the subterranean oil-containing formation to obtain the solid particles-stabilized emulsion, wherein:
the solid particles-stabilized emulsion does not form a flow barrier for diverting flow of hydrocarbons in a subterranean formation;
the solid particles-stabilized emulsion does not form effective horizontal barriers to vertical flow of gas or water to reduce coning of the gas or water to the oil producing zone of a well; and the solid particles-stabilized emulsion does not fill high permeability formation zones for profile modification applications to improve subsequent waterflood performance.

* * * * *